(12) United States Patent
    Gori

(10) Patent No.: US 8,217,799 B2
(45) Date of Patent: Jul. 10, 2012

(54) SYSTEM FOR MONITORING THE STATE OF ELECTRICAL POWER SUPPLY AND MECHANICAL TENSION IN AN OVERHEAD CONTACT LINE

(75) Inventor: Maurizio Gori, Arezzo (IT)

(73) Assignee: Bitimec S.r.l., Arezzo (IT)

( * ) Notice: Subject to any disclaimer, the term of this patent is extended or adjusted under 35 U.S.C. 154(b) by 461 days.

(21) Appl. No.: 12/513,749

(22) PCT Filed: Nov. 7, 2007

(86) PCT No.: PCT/IT2007/000782
§ 371 (c)(1),
(2), (4) Date: Dec. 1, 2009

(87) PCT Pub. No.: WO2008/056393
PCT Pub. Date: May 15, 2008

(65) Prior Publication Data
US 2010/0073182 A1    Mar. 25, 2010

(30) Foreign Application Priority Data

Nov. 10, 2006  (IT) ................................ FI2006A0278

(51) Int. Cl.
*G08B 21/00* (2006.01)
(52) U.S. Cl. ........................................ 340/668; 340/665
(58) Field of Classification Search .................. 340/668, 340/665
See application file for complete search history.

(56) References Cited

U.S. PATENT DOCUMENTS 3,829,631 A * 8/1974 Retallack ........................ 191/66
4,357,501 A * 11/1982 Clerc ............................. 191/83

FOREIGN PATENT DOCUMENTS

DE           198 54 369 A1    11/1999

* cited by examiner

*Primary Examiner* — Travis Hunnings
(74) *Attorney, Agent, or Firm* — McGlew and Tuttle, P.C.

(57) ABSTRACT

The system comprises a multiplicity of control and signaling devices (3), at least one for each line segment, each provided with a circuit able to detect the presence, in the segment of contact line (1), of the traction voltage and to signal its presence or absence locally.

8 Claims, 3 Drawing Sheets

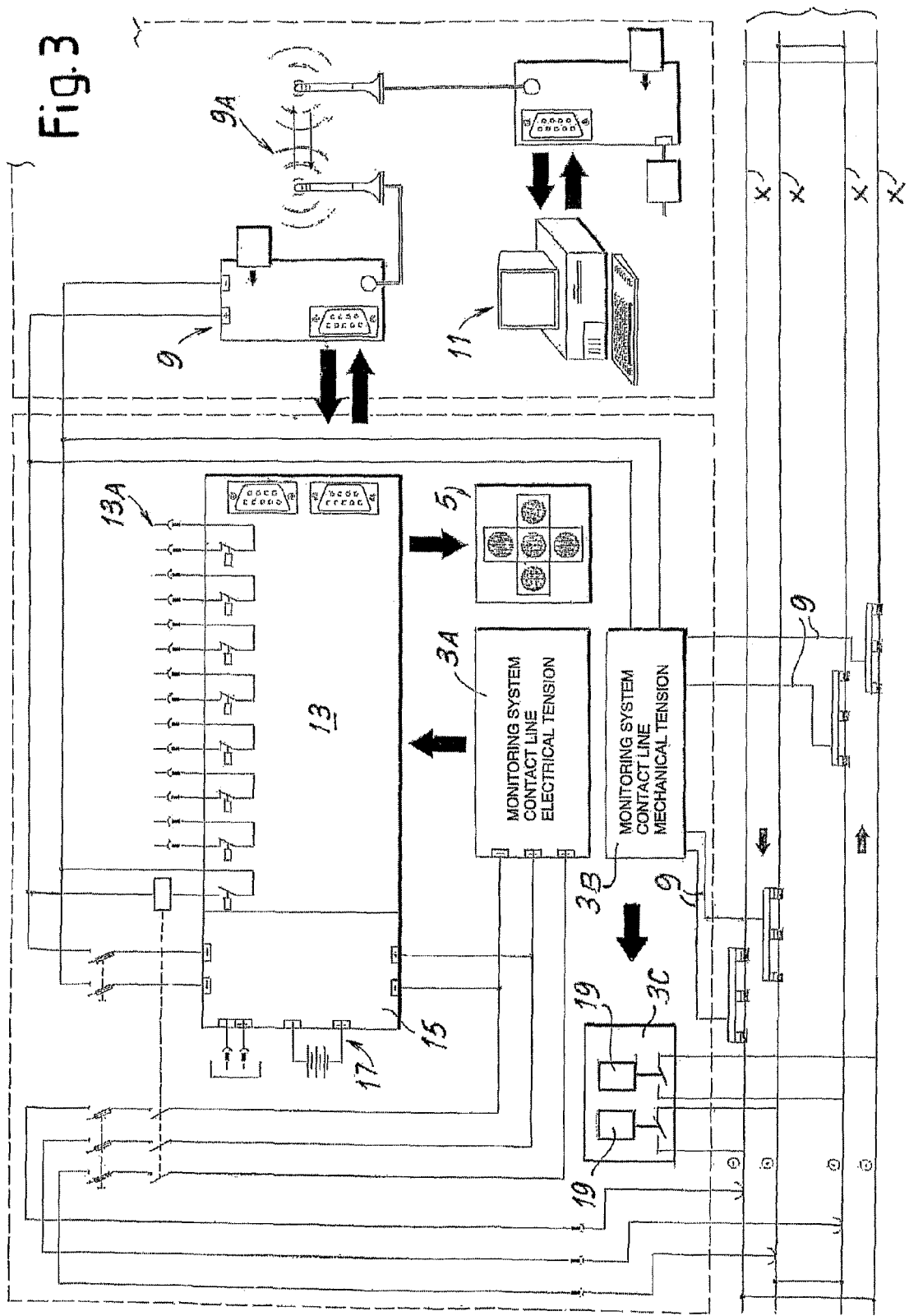

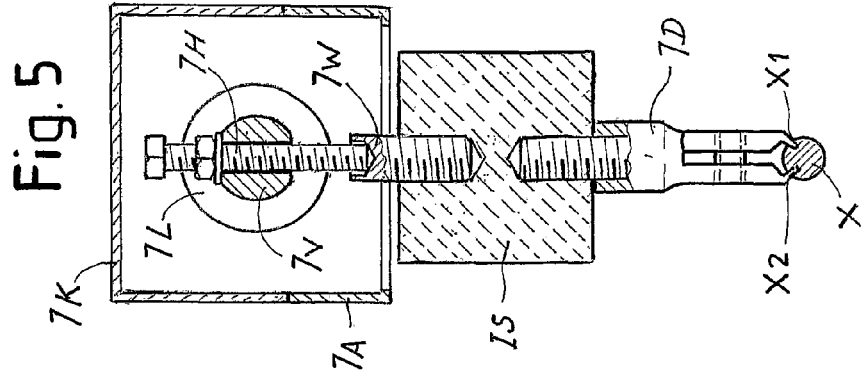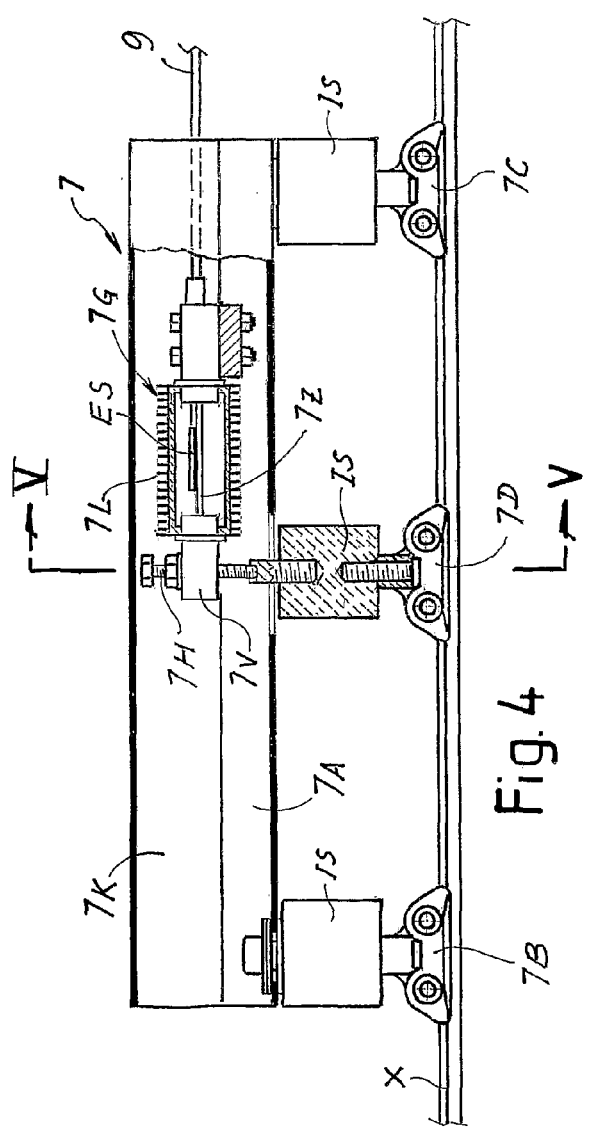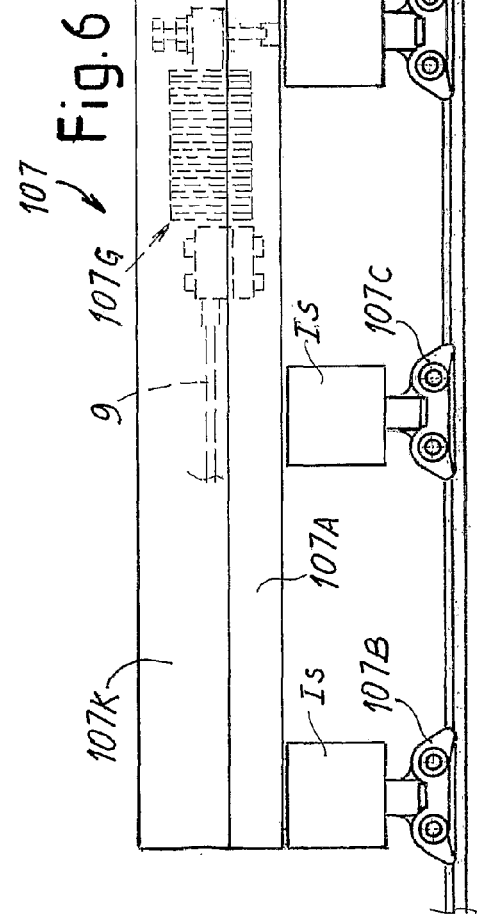

SYSTEM FOR MONITORING THE STATE OF ELECTRICAL POWER SUPPLY AND MECHANICAL TENSION IN AN OVERHEAD CONTACT LINE

The present invention relates to a system for improving the safety of overhead contact electrical lines used to power electric-drive vehicles such as trains, trolley cars, trolley buses and the like, both to comply with the European standard "EN 50122-1/1998-03—Protective provisions relating to electrical safety and earthing", aimed at preventing the accidental breakage of a conductor of a contact line from constituting a hazard of electrocution or of another kind, and to prevent one of said vehicles from occupying a line segment lacking voltage, with the consequent unexpected stop of the vehicle and obstruction of the route.

In general, said contact lines are formed by a succession of segments of conductors able to be selected electrically and tensioned mechanically independently of each other. According to the invention, the monitoring system comprises, for each line segment, at least a control and light signaling device positioned along the contact line in order to provide an alarm signal to the drivers of the vehicles using the contact line when the voltage of the line is missing, and consequently to shut off the power supply to the conductors of the respective segment automatically and rapidly. In fact, the lack of voltage in these conductors, in addition to causing the sudden stop of the vehicles that occupy said line segment, possibly hindering local traffic, can derive from an anomalous state of the line itself, state that can present hazards for the transported persons or for those who are near the affected line.

According to the invention, the control and signaling device can also comprise a device able to measure the value of the mechanical tension of the conductors of each segment by means of respective sensors and, in case of anomaly (e.g. as a result of the breakage of the conductor), to activate an alarm signal and shut off the electrical power supply to the respective line segment. For this latter purpose, in proximity to the device a box of contactors is positioned, which are operated by the device itself in case of anomaly of the mechanical tension of a controlled line segment, each contactor being able to short-circuit the respective line segment and thereby tripping the respective sub-station knife switch, shutting off voltage to the segment. In this way, the line segment, in which an anomalous mechanical tension is present, is rendered safe, and electrical power supply may be restored only after having repaired the fault.

The system can also comprise a central monitoring unit to which, through suitable transmission means, said control and peripheral signaling devices transmit the state of power supply and mechanical integrity of the respective line segment, thereby centralizing monitoring and the capabilities of rapid intervention in case of anomaly.

These transmission means are preferably in GSM telephony with automatic transmission of a text message when an anomaly occurs, or they can be any other known communication system, such as telephony via cable, fiber optics, via ether, etc.

Other characteristic aspects of the invention are mentioned in the appended claims.

The invention shall be better understood by following the description and the accompanying drawing, which shows a non limiting example of the finding itself. In the drawing:

FIG. 3 is a simplified wiring diagram of the system;

FIG. 4 is a side view of a sensor device for measuring the mechanical tension of a contact line conductor of FIGS. 1 and 2;

FIG. 5 is a cross section view according to V-V of FIG. 4; and

FIG. 6 is a similar view to that of FIG. 4 in another embodiment of the device.

Figure 1:
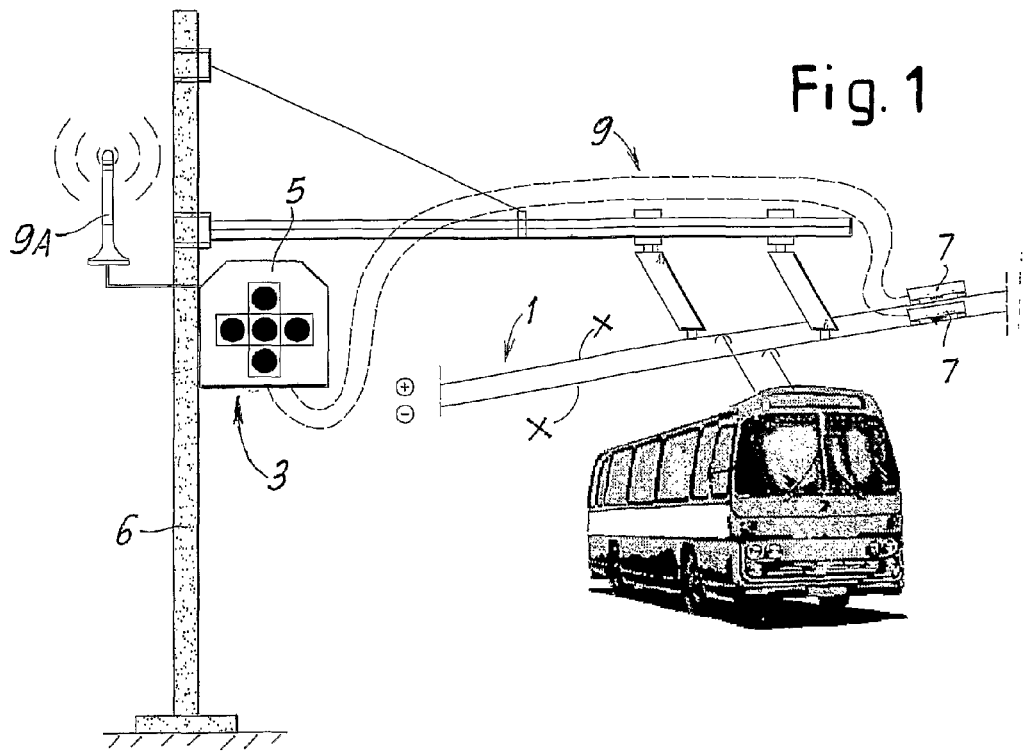
FIGS. 1 and 2 show the monitoring system according to the invention applied respectively to a trolley bus line and to a trolley car line, i.e. on rails.
Figure 2:
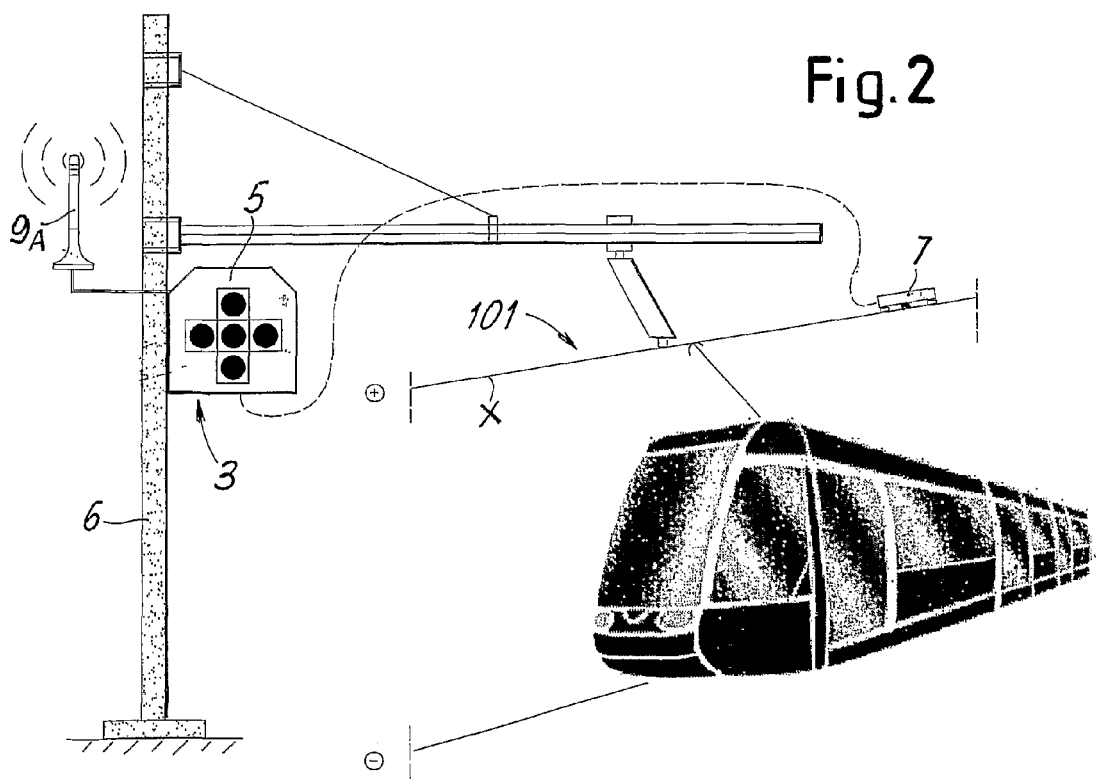

Reference is made to FIGS. 1 and 2, in which elements having the same function are indicated with the same reference number. The system according to the invention is provided for monitoring an overhead contact line for electrical vehicles. By way of example, FIG. 1 refers to a double line 1 for powering trolley buses, whilst FIG. 2 refers to a single line 101 with return to ground for a rail line.

For each independent line segment, the system comprises a box shaped peripheral control and signaling device 3 provided externally with a panel 5 for light signals, the unit being applied for example to a support pylon 6 for supporting the line 1, 101 in such a way that the panel 5 is clearly visible for the drivers of the vehicles that travel over the line segment preceding the one monitored by the device.

The device 3 substantially comprises: a circuit 3A (see also FIG. 3) able to detect the presence of voltage on the line; a circuit 3B able to detect the presence of the correct mechanical tension in the conductors of the contact line 1, 101, this voltage being detected for each conductor by a related sensor 7 (see also FIGS. 4 to 7) and transmitted to the circuit 3B by means of connecting cables 9; transmission means, such as a GSM telephone unit 9 with related antenna 9A, able to sent to a central monitoring unit 11 (FIG. 3) pre-recorded short messages (SMS) corresponding to predetermined events to be monitored; a microprocessor control circuit 13 that dialogues with these sensor circuits 3A, 3B and, by means of outputs 13A, it lights on the panel 5 indicator lights of different colors according to the events to be signaled.

The complex is powered by the line 1, 101 through a direct voltage converter 15 able to lower line voltage (e.g. 750 V) to a safe voltage suitable for logic command circuits (e.g. 24V), the converter 15 being also provided with a battery 17 maintained buffer charged to enable the peripheral unit 3 to function even without voltage in the contact line 1.

In a preferred embodiment (FIGS. 4 and 5), each sensor 7 of the mechanical tension of the conductor X comprises:

a structure 7A shaped as a longitudinal beam, e.g. made of a metallic section bar, developed parallel to the conductor X and fastened above it by means of end terminals 7B, 7C with interposition of respective insulators IS, in such a way as to prevent the voltage of the conductor X from being transmitted to the sensor itself. These terminals 7A, 7B grip in a pair of grooves X1, X2 (FIG. 5) obtained longitudinally in the upper part of the conductor X and throughout the length thereof. In this way, remaining above the conductor, the sensor 7 can be applied along the conductor X in any position to enable the free passage of the trolleys of the vehicles that travel through the line, the trolley being in contact with the lower surface of the conductor X;

a load cell 7G applied centrally to the structure 7A in the way described below, that engages a third terminal 7D with interposition of a respective insulator IS. This central terminal 7D is similar to the end terminals 7B, 7C and similarly it is clamped above the conductor X but, unlike the end terminals, it is not fastened integrally with the structure 7A of the sensor 7. The sensitive part of the load cell 7G comprises a strain gauge ES applied in classic manner to a metal bar 7Z which is developed parallel to the conductor X and an end whereof is fastened rigidly to the structure 7A. To the other end of the bar 7Z is fastened a terminal block 7V that presents a threaded hole in which is inserted, orthogonally to the bar 7Z, a pressure screw 7H that is made to point in an upper cavity of a threaded pivot pin 7W that is screwed in the insulator IS of the central terminal 7D. The strain gauge ES is electrically connected, through cables 9, with the circuit 3B (FIG. 3) for monitoring the mechanical tension of the contact line. A lid 7K of the structure 7A and a bellows 7L protect the load cell 7G from impacts and from weather elements.

For operation, the sensor 7, by means of the related terminals 7B, 7C, 7D, is applied to the conductor X when it is subjected to a correct longitudinal traction force, e.g. in the order of 1000 kg for a conductor with a diameter of about 15 mm. Under such conditions, the adjusting screw 7H for regulating the force transmitted by the conductor X to the load cell 7G according to a predetermined value is screwed to point on the central terminal 7D. In this way, a change in the traction force in the conductor X externally to the end terminals 7B, 7C, no longer offset by an equal stress on the conductor segment between these terminals, causes a variation in the elastic condition of the structure 7A flexing it, with a change in the transverse force transmitted by the conductor X, by means of the central terminal 7D, to the load cell 7G. Therefore, the signal sent by the load cell 7G to the control circuit 3B is changed consequently and, if said change exceeds a pre-set threshold, the control circuit 3B activates an alarm and shuts off the power supply to the related line segment. This occurs for example when the contact line has been interrupted physically or has detached from one or more supports, with substantial change to its state of mechanical tension.

FIG. 6 shows another embodiment of a tension sensor for measuring the mechanical tension of the conductor X. In this case, too, the tension sensor 107 comprises a longitudinal structure 107A fastened to the conductor X by means of two terminals 107B, 107C, and a third terminal 107D, similar to the terminal 7D of FIG. 4, is applied to a load cell 107G fastened to the structure 107A. However, in this case the terminal 107D and the cell 107G are positioned at an end of the bar 105A instead of at the center thereof. In this case, as well, a change in the state of mechanical tension of the conductor X of the contact line determines a change in the state of stress on the structure 107A, causing a change in the signal emitted by the load cell 107G.

Each signaling panel 5 comprises for example five lights of various colors, to indicate to the drivers of the vehicles powered by the contact line, and also to those who perform the maintenance on the system, the state of power supply and physical continuity of the contact line segment which the vehicle is about to engage. For example, the luminous optical signal can be colored green or red depending on whether voltage is present or not in the controlled line segment.

Preferably, signaling is performed with solid state lamps (High Power LED) that assure high luminous efficiency, long working life (some tens of times longer than traditional incandescence lamps), excellent resistance to mechanical stresses and excellent color gradation and intensity.

To assure maximum signaling visibility both during hours and in areas with strong ambient light and during the night, the control and signaling device 3 may comprise an ambient light sensor (not shown) that proportionally modulates the luminous intensity emitted by the lamps.

Substantially, in a preferred embodiment of the control and signaling device, the apparatus comprises:
a first circuit 13 which, operating at very low (safety) voltage through a microprocessor, controls a circuit for supplying power to the lamps, handles preventive and alarm diagnostics, manages the composition and the transmission of alarms and data, and monitors the battery charge;
a second circuit 15 that comprises a high-efficiency DC/DC converter and, with adequate insulation, transforms the line voltage to the levels and with the power necessary to power the whole system;
a third circuit 3A for the recognition of the presence of the electrical line voltage, the circuit being independent and parallel to the converter 15, so that the signaling will be correct even in case of breakage of the converter itself, with the consequent battery-powered operation;
a fourth circuit 3B connected to the tension sensors 7 for measuring the mechanical tension of the cables of the line 1, 101 applied in proximity to suspensions of the cables themselves, able to monitor the physical continuity of the contact conductor and, through a box 3C of short circuit contactors 19, to short-circuit the line segment in which a mechanical tension anomaly has occurred, and thereby causing the related sub-station knife switch to trip to shut off voltage from the segment itself.

The system is thus able to prevent electrocution risks in case of breaks of the conductor with the powered line. I fact, if the mechanical tension sensor signals that the mechanical tension of the cable is lacking or insufficient, the system short-circuits the line and hence promptly shuts off the power supply to the line to restore safe conditions. The anomaly situation is sent to the central control post or unit through the communication means of the peripheral control and signaling device 3, so that the central post is immediately and automatically informed of which area of the line was affected by the fault.

The system can therefore detect and signal locally—through the signaling panel 5—and to the remote control unit 11, through the aforesaid transmission means, the following malfunctions:
absence of traction voltage in the line (under these conditions, the individual control and signaling devices 3 are battery-powered);
improper operation of the DC/DC converter;
failure of individual lamps;
improper operation of the light power supply;
battery run down or approaching the end of its working life.

Through the part controlling the mechanical continuity of the conductor, the system is able to detect and signal anomalies of the mechanical state of the contact line caused, in general, by a break in the conductor.

The operating control center comprises a computer whereon runs a diagnostic monitoring and protection program for the contact lines. The center enables to control and interact remotely with the electrical power supplies for the safety of the line.

It is understood that the drawing shows merely an example provided solely as a practical demonstration of the finding, which may vary in its forms and arrangements without thereby departing from the scope of the concept on which the finding is based. The presence of any reference numbers in the appended claims serves the purpose of facilitating reading the claims with reference to the description, and does not limit the scope of the protection represented by the claims.

The invention claimed is:

1. A sensor device for detecting the mechanical tension of an overhead contact line conductor for the electrical drive of vehicles and emitting an electric signal correlated to said mechanical tension, the sensor device comprising:

a linear structure fastened to the conductor, above said conductor, by means of at least two terminals integral with said linear structure and distanced from each other along the conductor, wherein said linear structure has a third terminal fastened to the conductor and applied to a load cell to measure the force transmitted by the conductor to said load cell orthogonally to the conductor said force being correlated to the state of mechanical tension of the conductor.

2. A sensor device as claimed in claim 1, wherein said third terminal for controlling the state of tensioning of a conductor is located, along the conductor, interposed between the other at least two terminals.

3. A sensor device as claimed in claim 1, wherein said third terminal for controlling the state of tensioning of a conductor is located, along the conductor, externally to the other at least two terminals.

4. A system for monitoring overhead contact lines for the electrical drive of vehicles, the lines being subdivided into independent segments for electrical power supply and for mechanical tensioning, the system comprising, for each of said independent line segments, a control device provided with a circuit connected through electrical cables to one or more sensors of the mechanical tension of the cables of the controlled line segments to activate an alarm or shut off the electrical power supply to the conductors of said segment when the value of said mechanical tension is outside a range of acceptability, wherein said sensor for controlling the state of mechanical tensioning of a single conductor of the contact line comprises a linear structure fastened to the conductor above said conductor, by means of at least two terminals integral with said linear structure and distanced from each other along the conductor, and a third terminal fastened to the conductor and applied to a load cell to measure the force transmitted by the conductor to said load cell orthogonally to the conductor itself, said force being correlated to the state of mechanical tension of the conductor.

5. A system according to claim 4, further comprising a circuit able to detect the presence in the respective segment of contact line of the traction voltage and to signal its presence or absence locally by means of at least one luminous signaling device positioned in such a way as to show the luminous signaling to the drivers of the vehicles that travel through the segment preceding the one monitored by the device.

6. A system as claimed in claim 5, wherein said signaling is performed by means of a panel provided with lamps of multiple colors.

7. A system as claimed in claim 5, wherein each of said control and signaling devices comprises transmission means) for transmitting signals to a central monitoring unit, to activate an alarm signal therein when the lack of voltage or an inadequate mechanical tension is detected in a segment of the line.

8. A system as claimed in claim 7, wherein said transmission means comprise a GSM transmitting/receiving unit, and a related SMS message to be transmitted is stored for each event controlled by the device.

* * * * *